United States Patent
Shenoy

(10) Patent No.: US 10,803,414 B2
(45) Date of Patent: Oct. 13, 2020

(54) RISK IDENTIFICATION IN SUPPLY CHAIN

(71) Applicant: Dassault Systemes Americas Corp., Waltham, MA (US)

(72) Inventor: Girish B. Shenoy, Rochester Hills, MI (US)

(73) Assignee: Dassault Systemes Americas Corp., Waltham, MA (US)

( * ) Notice: Subject to any disclaimer, the term of this patent is extended or adjusted under 35 U.S.C. 154(b) by 881 days.

(21) Appl. No.: 15/164,431

(22) Filed: May 25, 2016

(65) Prior Publication Data

US 2017/0344920 A1    Nov. 30, 2017

(51) Int. Cl.
  *G06Q 10/06* (2012.01)
  *G06Q 10/08* (2012.01)
(52) U.S. Cl.
  CPC ....... *G06Q 10/0635* (2013.01); *G06Q 10/087* (2013.01)
(58) Field of Classification Search
  None
  See application file for complete search history.

(56) References Cited

U.S. PATENT DOCUMENTS

| | | | |
|---|---|---|---|
| 2006/0004617 A1* | 1/2006 | Najmi ............. | G06Q 10/06315 705/7.25 |
| 2006/0085323 A1* | 4/2006 | Matty ................... | G06Q 10/08 705/38 |
| 2011/0137703 A1* | 6/2011 | Dugan .................. | G06Q 40/08 705/7.28 |

(Continued)

FOREIGN PATENT DOCUMENTS

WO    WO 00/17773    3/2000

OTHER PUBLICATIONS

Mousavian et al. (A Probabilistic Risk Mitigation Model for Cyber-Attacks to PMU Networks, Published in: IEEE Transactions on Power Systems (vol. 30, Issue: 1 , Jan. 2015), pp. 156-165).*

(Continued)

*Primary Examiner* — Matthew D Henry
(74) *Attorney, Agent, or Firm* — Hamilton, Brook, Smith & Reynolds, P.C.

(57) ABSTRACT

Computer systems and methods that identify and assess risk in a supply chain network. The systems and methods create a visual model of a supply chain network, which includes: (i) logical stations graphically representing the physical sites in the supply chain network, and (ii) logical transits graphically representing the transportation of materials between the represented physical sites. For each given logical station, the systems and methods identify risk values for risk categories associated with the physical site. The systems and methods identify the risk values based on physical conditions related to: (a) the physical site represented by the given logical station, (b) each physical site represented by a logical station positioned in a downstream supply chain path to the given logical station, and (c) each transportation represented by a logical transit positioned in the downstream supply chain path. The systems and methods generate dynamic graphical indications comparing the identified risk values for the risk categories and total risk values for the represented physical sites and transportations.

20 Claims, 8 Drawing Sheets

(56) References Cited

U.S. PATENT DOCUMENTS

2014/0343999 A1* 11/2014 Kim ................. G06Q 10/06313
　　　　　　　　　　　　　　　　　705/7.23
2015/0120373 A1*  4/2015 Bajaj ................ G06Q 10/06315
　　　　　　　　　　　　　　　　　705/7.25

OTHER PUBLICATIONS

IET, The Institution of Engineering and Technology, "Quantified Risk Assessment Techniques—Part 3 Fault Tree Analysis—FTA", Health & Safety Briefing No. 26c, Aug. 2012.

Manuj, Ila. and Mentzer, John T., "Global Supply Chain Risk Management", Journal of Business Logistics, vol. 29, No. 1, pp. 133-155 (2008).

Risks in Global Supply Chains, The Geography of Transport Systems, https://people.hofstra.edu/geotrans/eng/ch9en/supply_chain_risks.html retrieved from Internet Mar. 2, 2016.

The Seattle Times, Business & Technology, "Building the Dreamliner", http://old.seattletimes.com/multimedia/news/business/building-the-dreamliner/boeing-787.html Retrieved from Internet May 6, 2016.

European Search Report for 17 16 8872 dated Jun. 22, 2017, 2 pages.

* cited by examiner

RISK IDENTIFICATION IN SUPPLY CHAIN

BACKGROUND

In global manufacturing enterprises, a delivered product may be produced from multiple manufactured and raw materials, and each of the multiple manufactured materials may, in turn, be produced from a flow of other manufactured and raw materials. In these enterprises, this flow of materials is generally represented as a supply chain network. The supply chain network typically includes each physical location (site) participating in the flow of materials, such as supplier sites, manufacturing sites, storage sites, distribution sites, and retail sites. The supply chain network also typically includes the transportation used to convey the materials between these sites. The majority of existing supply chain modeling solutions represents the supply chain network in a tabular format, which causes visibility difficulties when a user attempts to view the complete chain of sites and transportations included in the supply chain network; especially when representing a multi-tier supply chain network. In addition, prior supply chain modeling solutions do not identify or assess risks (uncertainties) associated with the flow of materials in a represented supply chain network, such as risks associated with each represented site and represented transportation between these represented sites, due in part to the limited risk related data accessible by these solutions. As such, these prior supply chain modeling solutions do not provide visibility of the risks associated with the flow of materials within the represented supply chain network. Thus, there is a need in global manufacturing enterprises for a supply chain modeling solution which provides visibility of the risks associated with the flow of materials within a represented supply chain network.

SUMMARY OF THE INVENTION

The present invention addresses the limitations of prior supply chain modeling solutions by providing a modeling solution that comprises a visual model of a supply chain network, including risks (uncertainties) associated with the supply chain network. The visual model depicts physical sites, referred to as logical stations, as nodes, and depicts physical transportation of materials between the physical sites, referred to as logical transits, as links or paths. Further, the modeling solution of the present invention accesses extensive supply chain related data, including supply and production data collected from respective physical sites, and location-related data (e.g., environmental, geopolitical, economic, technological, and such conditions of the physical site) retrieved from external sources (e.g., external aggregators). The modeling solution of the present invention accesses this supply chain related data to identify and assess risks associated with each depicted physical site and associated with the flow of material on each path of the represented supply chain network. The modeling solution of the present invention presents the identified risk at the respective logical stations and logical transits comprising the visual model to provide visibility of the risk associated with the entire supply chain network (and the particular physical sites and particular physical transportation between physical sites contributing to the risk).

Specifically, the present invention is directed to computer systems and computer-implemented methods for modeling a supply chain network. The computer systems and computer-implemented methods may include at least one processor communicatively coupled to a user interface and to computer memory for determining and presenting the risk. The computer systems and computer-implemented methods, first, create and store in computer memory, a visual model of a supply chain network. The created visual model includes: (i) one or more logical stations graphically representing the physical sites in the supply chain network, and (ii) one or more logical transits graphically representing the transportation of materials between the represented physical sites. In some embodiments, the logical stations graphically represent at least one of: a supplier site, a production (or manufacturing) site, an inventory site, a storage site, a distribution site, a retail site, and a customer site.

For each given logical station graphically representing a respective physical site of the supply chain network, the computer systems and computer-implemented methods identify risk values for a set of risk categories associated with the respective physical site. In example embodiments, the set of risk categories include at least one of: environmental risk, source risk, delivery risk, planning risk, and production risk. For each given logical station, the computer systems and computer-implemented methods identify the risk values based on determining physical conditions related to: (a) the physical site represented by the given logical station, (b) each physical site represented by a respective logical station positioned in a downstream supply chain path to the given logical station, and (c) each transportation represented by a respective logical transit positioned in the downstream supply chain path. In some of these embodiments, the identified risk values for the environmental risk, source risk, delivery risk, and planning risk are determined based on geolocation of the respective site. In some of these embodiments, the identified risk values for the delivery risk are based on the methods used for the transportation of materials between the represented physical sites. In some of these embodiments, the identified risk values for the production risk are based on production processes at the represented physical sites. In example embodiments, the identified risk values are probabilistically calculated using a fault tree analysis.

For each given logical station, the computer systems and computer-implemented methods generate a graphical representation (or other indication) visually comparing the identified risk values for the set of risk categories, which is displayed at the given logical station. The computer systems and computer-implemented methods also determines a total risk value for the given logical station based on the identified risk values for the set of risk categories. The computer systems and computer-implemented methods designate a visual indication of the determined total risk value based on comparing the determined total risk value to a risk tolerance threshold, which is presented at the given logical station. In some embodiments, the designated visual indication displays a color, such as red, green, and yellow, based on the comparison between the determined total risk value and the risk tolerance threshold. In some of these embodiments, the computer systems and computer-implemented methods depict the designated visual indication as a traffic light displaying the red, green, or yellow color based on the comparison between the determined total risk value and the risk tolerance threshold. In example embodiments, the determined total risk values are probabilistically calculated using a fault tree analysis.

Based on the identified risk values for each logical station, the computer systems and computer-implemented methods may also determine probabilistic risk contributed by each downstream supply chain path to a given logical station. The computer systems and computer-implemented methods may visually indicate (e.g., highlight in a designated color) the determined probabilistic risk at the respective supply chain path in the visual model. In some embodiments, the determined probabilistic risk may include determining a critical supply chain path that contributes a highest probabilistic risk to the given logical station. The computer systems and computer-implemented methods may visually indicate (e.g., highlight in a designated color) the determined highest probabilistic risk at the respective supply chain path in the visual model. The computer systems and computer-implemented methods further display on the user interface (computer screen view), the visual model having the generated graphical representations at respective logical stations and having the designated visual indications at respective logical stations, said displayed visual model providing risk assessment in the modeled supply chain network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows. The teachings of all patents, published applications, and references cited herein are incorporated by reference in their entirety.

Risk in Supply Chain Networks

A supply chain network may be used to organize and structure material flow and resource usage for a global manufacturing organization. Specifically, the supply chain network models the end-to-end flow of materials (e.g., the bill of materials) and usage of resources for the global manufacturing organization to produce and deliver a finished end-product. For example, the supply chain network may model the flow of raw materials provided from external supplier sites, through the production of these raw materials into component materials at external supplier manufacturing sites (e.g., original equipment manufacturers (OEMs)), to the production of the component materials into a finished end-product at a manufacturing site of the organization, and, then, to the delivery of the finished end-product to customers through storage, distribution, and retail sites. These different sites are physical locations that may include mines, farms, refineries, plants/factories, docks/terminals/ports, warehouses, distribution centers, retail stores, and the like. The supply chain network also models the transportation between the sites modeled in the supply chain network. The modeled transportation may include different types of physical vehicles, including trucks, trains, ships, planes, and such, which may be configured with different fixtures for holding the respective materials during the modeled transportation.

Further, for a given modeled site, the supply chain network may also model the internal flow of materials and usage of resources to produce a component material or finished end-product within the given modeled site. For example, the supply chain network may model the internal flow of materials from a receiving area within the modeled site (that receives component materials from one or more other modeled sites), to an inventory area within the modeled site (that takes inventory of the received component materials), to at least one of a manufacturing area and assembly area (that manufactures and/or assembles the inventoried component materials into a deliverable component material or end-product), to a warehouse area (that stores the manufactured/assembled deliverable component material or end-product), to a shipping area (that ships the manufactured/assembled deliverable component material or end-product). The supply chain network also models the transportation between these modeled physical areas within the modeled site in the supply chain network. The modeled transportation may include different types of physical vehicles, including forklifts, conveyor belts, cargo vehicles, and such, which may be configured with different fixtures for holding the respective materials during the modeled transportation.

Figure 1:
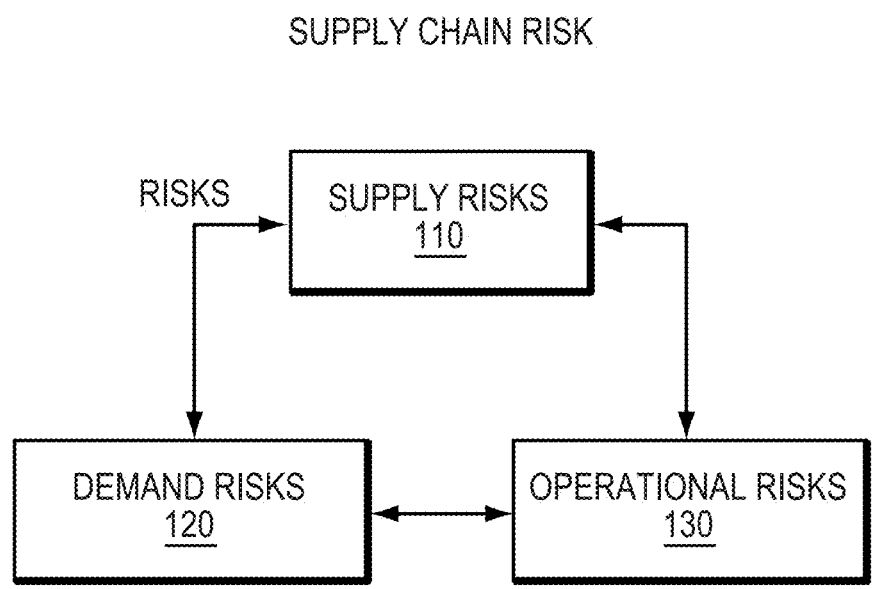
FIG. 1 is a diagram of general categories of risk for a supply chain network in embodiments of the present invention.

In the supply chain network, there are various uncertainties (risks) associated with each modeled site and modeled transportation in regards to supplying, producing, and delivering the finished end-product of the organization. See, e.g., Manuj et al., "*Global supply chain risk management strategies*," Journal of Business Logistics, Vol. 29, No. 1, pages 133-156 (2008), which is incorporated herein by reference in its entirety. In some embodiments, uncertainties (risks) may be specifically associated with particular modeled areas within a given modeled site. These various uncertainties may be organized into different interrelated categories of risk that are associated with each respective modeled site in the supply chain network. The different related categories of risk may comprise supply-related risk categories 110, demand-related risk categories 120, and operation-related risk categories 130, as shown in FIG. 1. The supply-related risk categories 110 account for the likelihood of events that would cause disruption of supply or inflation of price at a modeled site. The supply-related risk categories 110 may include sourcing risk, which identifies uncertainties associated with procuring materials from a supplier (or supplier manufacturer) external to the organization. For example, the external supplier may be situated in a geolocation remote from the business locations of the organization (e.g., a remote foreign country), where the economic and political climate is different than that of the business locations of the organization. As such, the sourcing risk may account for geopolitical factors, including political instability, trade restrictions, terrorism, corruption, theft, illiteracy, trade activity, piracy, and such, related to the geolocation of the supplier site. Sourcing risk may also consider geo-economic factors, including demand shocks, price volatility, currency fluctuation, energy shortages, and such, related to the geolocation of the supplier site. Sourcing risk may further consider geo-technical factors, including network infrastructure failures, information and communications technology (ICT) disruptions, and such, related to the geolocation of the supplier site.

Environmental risk is another similar supplier-related risk category 110 associated with an external supplier site. Environmental risk identifies uncertainties associated with the environmental conditions of the external supplier site, and, may account for environmental factors, including natural disasters, extreme weather, pandemics, and such, that have occurred (or are predicted to occur) at the geolocation of the external supplier site. The supplier-related risk categories 110 may further include risk associated with the modeled transportation between the modeled sites, which may be identified in a delivery risk category. The delivery risk category accounts for the risk associated with the one or more methods of transportation (e.g., freight train, ship, plane, truck, and the like) between two modeled sites and the fixtures required for transporting the materials using the respective one or more transportation methods (e.g., tank, cooling system, heating system, lifts, racks, and such). The delivery risk category may also account for risk associated with the geolocation of the transportation, including geo-political factors, such as trade restrictions, theft, piracy, and the like; geo-economic factors, such as border delays, energy shortages, and the like; geo-technical factors, such as communication disruptions during transit, and the like; and environmental factors.

The different categories of risk may also include demand-related risk categories 120 that account for possible events that would affect the likelihood of customers purchasing the end-product, or the likely volume of the end-product purchased by the customers. The demand-related risk categories 120 may include planning risk, which identifies uncertainties associated with the materials, or amount of materials, contracted from a modeled site as part of the manufacturing plans for the finished product. The planning risk may account for factors such as seasonality, new competitor products, short-lived enthusiasm for an end-product, distortion of demand, and the like. The different categories of risk may further include operations-related risk categories 130 that account for uncertainty in the manufacturing processes and resource usage internal to a modeled manufacturing site. The operations-related risk categories 130 may include production risk, which identifies the risk of failure or delay in the breakdown of the manufacturing processes, and accounts for such uncertainty factors as processing capabilities, processing variations, changes in processing technology, changes in processing costs, and the like, at the modeled site. Embodiments of the present invention may apply some or all of these risk categories and uncertainty factors, along with any other risk category and uncertainty factor that may be used to identify and assess risk/uncertainty in a supply chain network.

The uncertainty factors related to each category of risk may be used to determine a probabilistic value that assesses the risk level for the respective category of risk. In some embodiments, the uncertainty factors may be applied as part of a fault tree analysis to make a quantified risk assessment (see, e.g., *"Quantified Risk Assessment Techniques—Part 3 Fault Tree Analysis—FTA,"* The Institute of Engineering and Technology, Health & Safety Briefing No. 26c (2012), which is incorporated herein by reference in its entirety) to determine a probabilistic value for each category of risk for a given site. In other embodiments, the uncertainty factors (or other such factors or guidelines) may be applied as part of any other risk assessment technique or calculation to determine a probabilistic value for each category of risk for a given site. In some embodiments, the uncertainty factors relevant to the general categories of risk (supply-related risk 110, demand-related risk 120, and operation-related risk 130) may be applied to determine probabilistic values for these respective general categories of risk in regards to a given site. In other embodiments, the uncertainty factors relevant to the specific categories of risk (e.g., sourcing risk, environmental risk, planning risk, delivery risk, production risk, and such) composing the general categories of risk may instead be applied to determine probabilistic values for these specific risk categories in regards to a given site.

The risk assessment of a given site may also include one or more other sites that affect the material flow to the given site (e.g., in a downstream path of the given site in the supply chain network). In some of these embodiments, the uncertainty factors may be applied to the given site, and the one or more other sites affecting the given site, together in one analysis to determine a cumulative probabilistic value for each category of risk for the given site. In other of these embodiments, the uncertainty factors may be applied separately to the given site, and each of the other sites affecting the given site, to determine separate probabilistic values for each respective physical site, which are then probabilistically calculated (and, in some embodiments, weighed, or otherwise adjusted) to generate a cumulative probabilistic value for each category of risk for the given site. Further, in some embodiments, the uncertainty factors for each of the risk categories may be applied together in one analysis to probabilistically calculate a total probabilistic risk value (assessed level of risk) for a given site. In other embodiments, the probabilistic value determined for each respective risk category may be calculated (and, in some embodiments, weighed or otherwise adjusted) to generate the total probabilistic risk value (assessed level of risk) for the given site.

Example System for Modeling a Supply Chain Network

Figure 2:
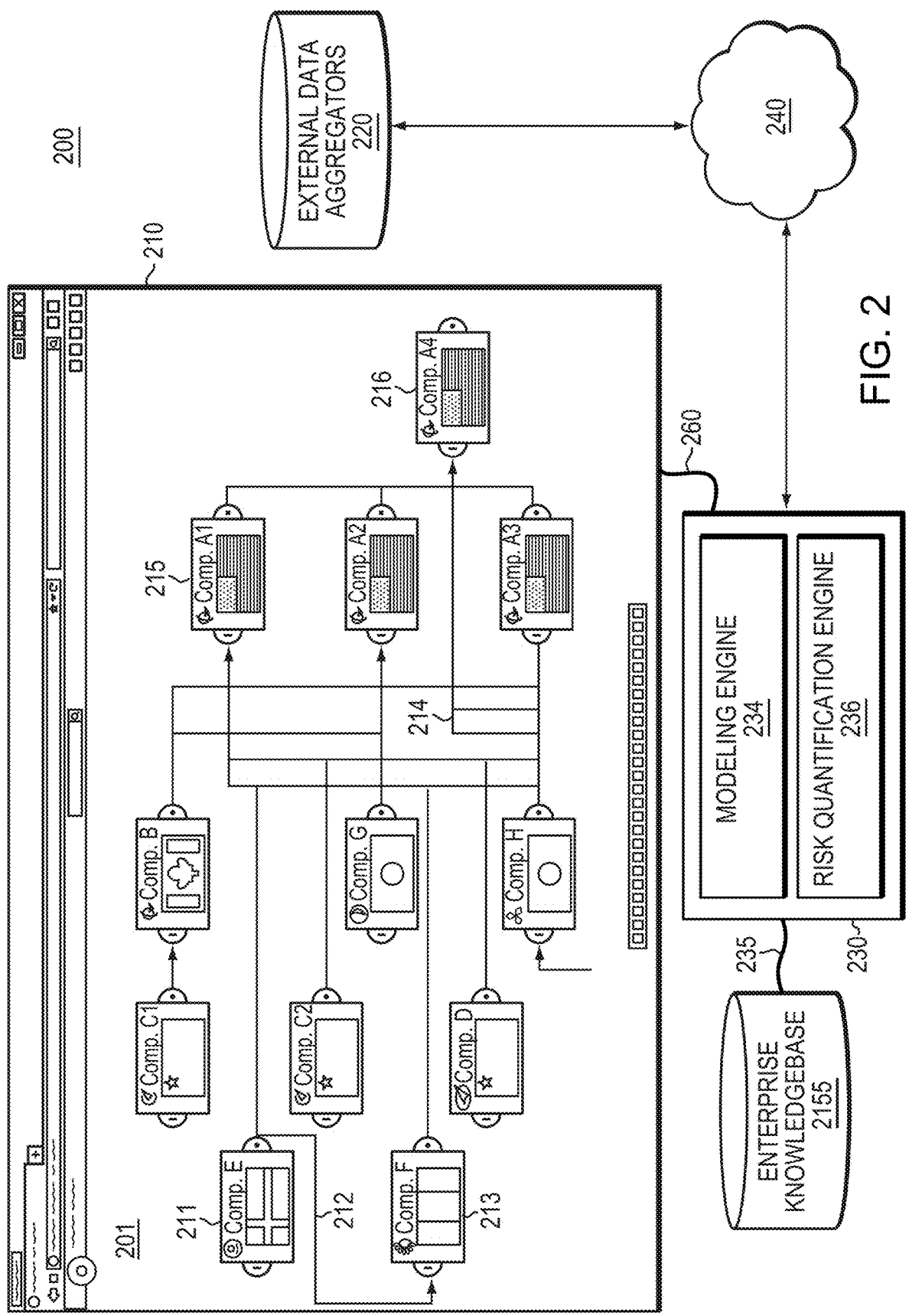
FIG. 2 is an example modeling system that provides a visual model of a supply chain network in embodiments of the present invention.

FIG. 2 is an example modeling system 200 that provides a visual model 201 for identifying and assessing risk in a supply chain network in embodiments of the present invention. In some example embodiments, the modeling system 200 is DELMIA 3DEXPERIENCE® by Dassault Systems. In the embodiment of FIG. 2, modeling system 200 includes a user interface display 210, which is communicatively connected via interface connection 260 to a processing environment 230. The interface connection 260 is illustrated in FIG. 2 as a wired interface, however, in some embodiments the interface connection 260 may be a wireless connection, such as WiFi or Bluetooth. The processing environment 230 may be configured with one or more processors that comprise at least a modeling engine 234 and a risk quantification engine 236.

The modeling engine 234 enables the planning, designing, analyzing, executing, and modifying of supply chain networks for an organization. Specifically, the modeling engine 234 generates a visual model 201 of a supply chain network, depicting the end-to-end material flow and resource usage for the organization to produce and deliver a finished end-product, and, displays the generated visual model 201 on the user interface 210 (via interface connection 260), as shown in FIG. 2. The visual model 201 provides visibility and traceability across the modeled supply chain network (e.g., a multi-tier supply chain network). The modeling engine 234 may generate the visual model 201 by loading a stored supply chain network from computer memory, such as from the Enterprise Knowledgebase 2155 (e.g., DELMIA Apriso® and ENOVIA) via connection interface 235 (which may be a wired or wireless connection). The modeling engine 234 may also generate the visual model 201 by enabling a user (human or system) to create a new supply chain network (e.g., from a visual template) or to modify a loaded supply chain network. In the generated visual model 201, physical sites of the supply chain network, including supplier sites, supplier manufacturing sites (OEM sites), organization manufacturing sites, storage sites, inventory sites, distribution sites, retail sites, customer sites, and such, are visually modeled as logical stations positioned as nodes in the visual model 201 of the supply chain network (e.g., logical stations 211, 213, 215, 216). In some embodiments (not shown in FIG. 2), the internal physical areas within a physical site, including receiving area, inventory area, manufacturing area, assembly area, storage area, painting and dispatching area, supplier area, and such are also visually modeled as internal logical stations within the logical station representing the physical site. Further, in the generated visual model 201, physical transportation of materials between the modeled physical sites (and in some embodiments, physical areas within the physical sites), such as by trucks, trains, ships, planes, and such, configured with different fixtures for holding the respective materials during the transportation, are visually modeled as logical transits (e.g., logical transits 212, 214) positioned as paths or links in the visual model 201 of the supply chain network.

In creating or modifying visual model 201, the modeling engine 234 enables the user to place logical stations as nodes and logical transits as paths in the visual model 201 of a supply chain network. The user places these logical stations and logical transits in a manner to configure the end-to-end material flow and resource usage for the organization to produce and deliver a finished end-product. In some embodiments, the modeling engine 234 provides the user graphical tools for placing a logical station (e.g., logical stations 211, 213, 215, 216) or a logical transit (e.g., logical transits 212, 214) in the visual model 201 on the user interface 210. In other embodiments, modeling engine 234 may provide the user other tools, such as configuration files, command-line interfaces, database interfaces (e.g., interface of Enterprise Knowledgebase 2155), or such, for specifying the placement of the logical station or logical transit in the visual model 201. The modeling engine 234 may further enable the user to assign details to configure the placed logical station, as the respective physical site (or physical area), or the placed logical transits, as the respective physical vehicle between two logical stations. The modeling engine 234 may similarly provide the user graphical tools on the user interface 210 or other tools as above-described to assign the details to the logical station or the logical transit. In some embodiments, the modeling engine 234 may continuously monitor the visual model 201 on the user interface 210 to dynamically update the size/scale and positioning/location of the logical stations and logical transmits to provide continued visibility and traceability across the modeled supply chain network (e.g., as new logical stations or logical transits are added to the visual model 201). In some embodiments, the modeling engine 234 may continuously monitor the visual model 201 on the user interface 210 to dynamically update the visual effects of the visual model 201 (e.g., highlighting logical stations or logical transits in color) to provide continued visibility and traceability of respective critical information (e.g., risk), as the modeling engine 234 detects or otherwise determines the changing critical information.

The assigned details for a logical station may include the geolocation (e.g., longitude, latitude, country, city, and such), associated company name (e.g., Comp. A1), type of site (e.g., supplier, OEM supplier, end-product manufacturer, warehouse, distributor, retailer, and such), type of site area (receiving area, inventory area, manufacturing area, assembly area, and such), material associated with site (e.g., particular raw material, component material, finished end-product, and such), and the like. In some embodiments, the user may view the assigned details by selecting (e.g., hovering over with a finger or pointing device) the displayed logical station in the visual model 201 on the user interface 210. In some embodiments, the modeling engine 234 may recognize the company name associated with the logical station (e.g., logical stations 211, 213, 215, 216), as a company which also uses the modeling system 200, and in which, the modeling system 200 has collected and stored at least one of supplier and production data in the Enterprise Knowledgebase 2155. In these embodiments, the modeling engine 234 may also reference this stored data from the Enterprise Knowledgebase 2155 (via connection interface 235) as part of the configured details for the logical station. The configured details for a logical transit (e.g., logical transits 212, 214) may include the geolocation of the transportation between two physical sites (e.g., longitude, latitude, country, city, and such), the type of transportation vehicle (e.g., truck, ship, plane, train, and such), the fixtures configured on the transportation vehicle (e.g., tank, cooling system, heating system, lifts, racks, and such) to carry the transported material, and the particular component being carried (e.g., airplane wing component). In some embodiments, the user may view the configured details by selecting (e.g., hovering over with a finger or pointing device) the displayed logical transit in the visual model 201 on the user interface 210.

As the user assigns details to a placed logical station (e.g., logical stations 211, 213, 215, 216) or logical transit (e.g., logical transits 212, 214), the modeling engine 234 may communicate these details to the risk quantification engine 236. The risk quantification engine 236 may, then, use these details to access data to determine (identify) risks (e.g., continuously or in real-time), associated with the respective site represented by the placed logical station or the respective transportation represented by the placed logical transit. For example, the risk quantification engine 236 may use the geolocation of the respective site or transportation, from the assigned details, to access data from external data sources 220 (e.g., aggregators such as Maplecroft, Reuters, and the like) over the Internet or other global computer network 240, regarding the conditions of the respective site or transportation, such as environmental, geopolitical, economic, technological, and any other such conditions. For another example, if the modeling engine 234 determines that production data was stored in the Enterprise Knowledgebase 2155 for the company associated with the placed logical station, the risk quantification engine 236 may access this production-related data from the Enterprise Knowledgebase 2155 (via connection interface 235) for the respective company. The risk quantification engine 236 may then analyze the accessed data relative to factors associated with a set of risk categories (e.g., sourcing risk, environmental risk, planning risk, delivery risk, production risk, and such), to determine respective risk values (and a total risk value) for the placed logical station or placed logical transit.

The determined risk values for respective risk categories and total risk values may be used by the modeling system 200 to automatically update the visual model 201 of the supply chain network to minimize associate risk/uncertainty. For example, based on the determined risk, the modeling system 200 may select or recommend certain sites, transportation, and processes (and a network thereof) for supplying and manufacturing the raw materials and component materials, as part of the modeled supply chain network, to produce a specific finished end-product with minimal risk/uncertainty. In some embodiments, the modeled supply chain network, which may have been automatically updated based on associated risk/uncertainty, is output in a format (e.g., as signals) to program control systems for the physical sites or physical transportation modeled in the supply chain network, or to program other modeling systems that control the operation of the physical sites or the physical transportations, to effect the operations of these physical sites or physical transits.

Modeling Risk in an Example Supply Chain Network System

Figure 3A:
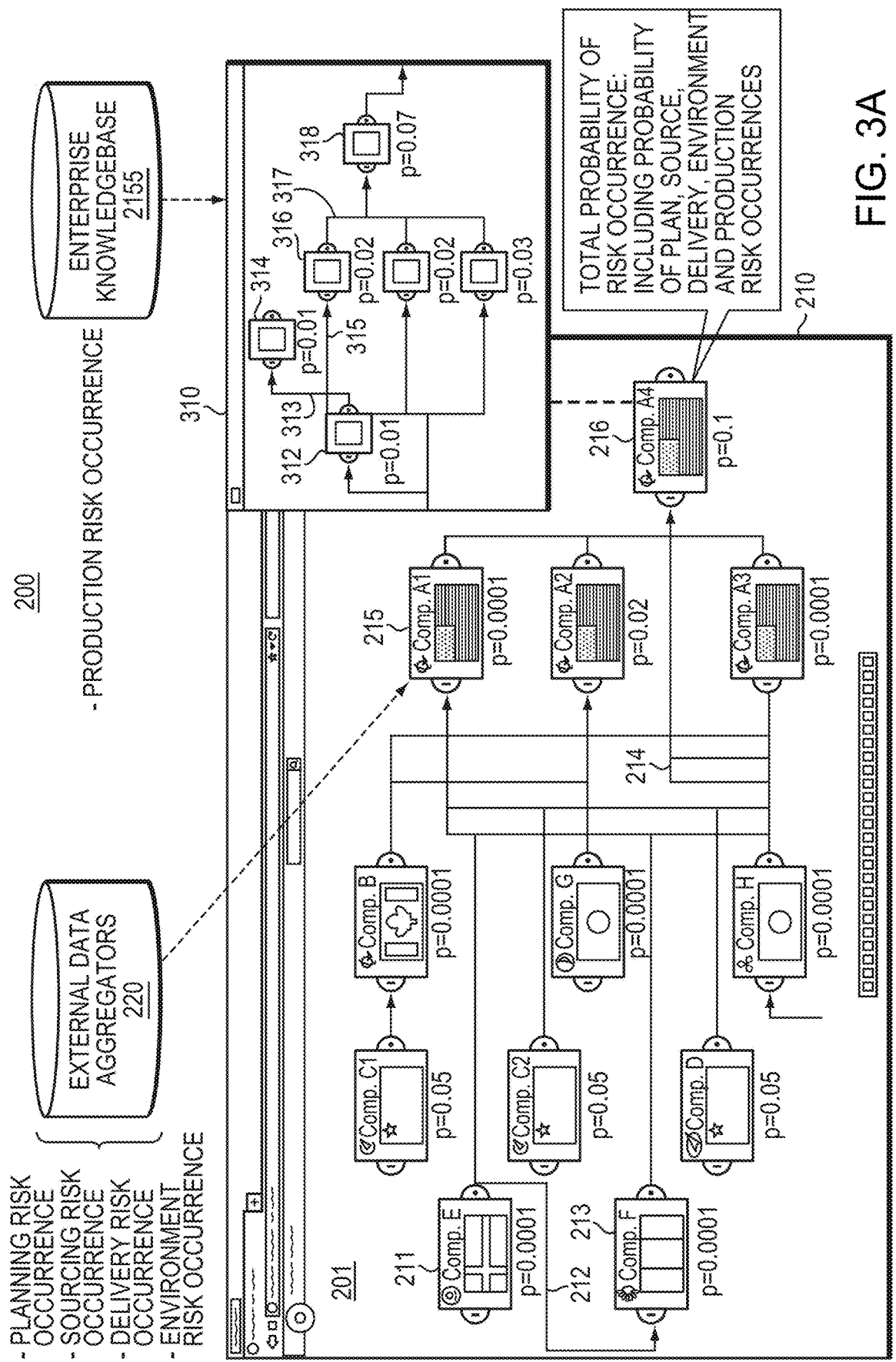
FIGS. 3A-3C illustrate identifying and assessing risk in a visual model of a supply chain network provided by the example modeling system of FIG. 2.
Figure 3B:
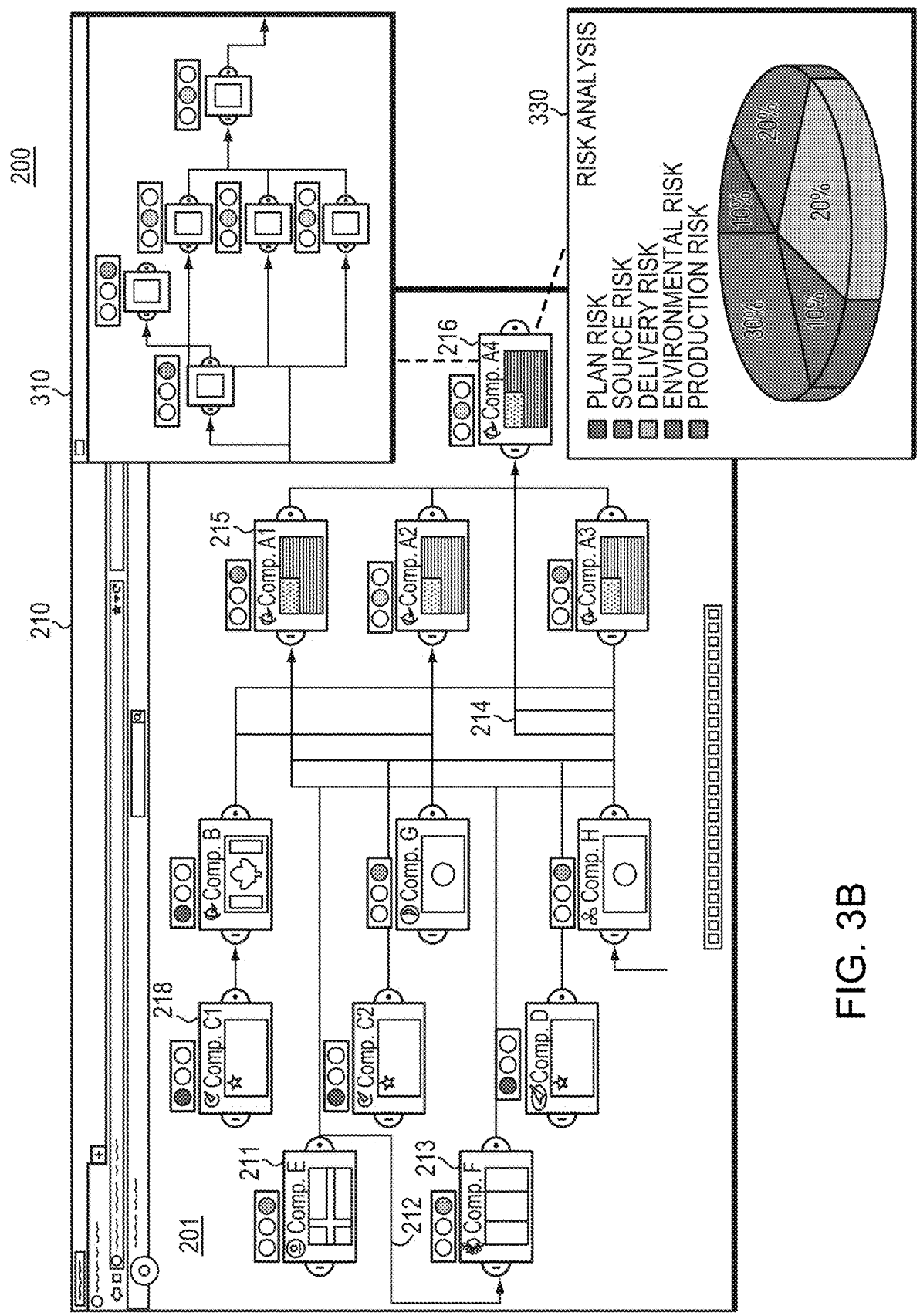
Figure 3C:
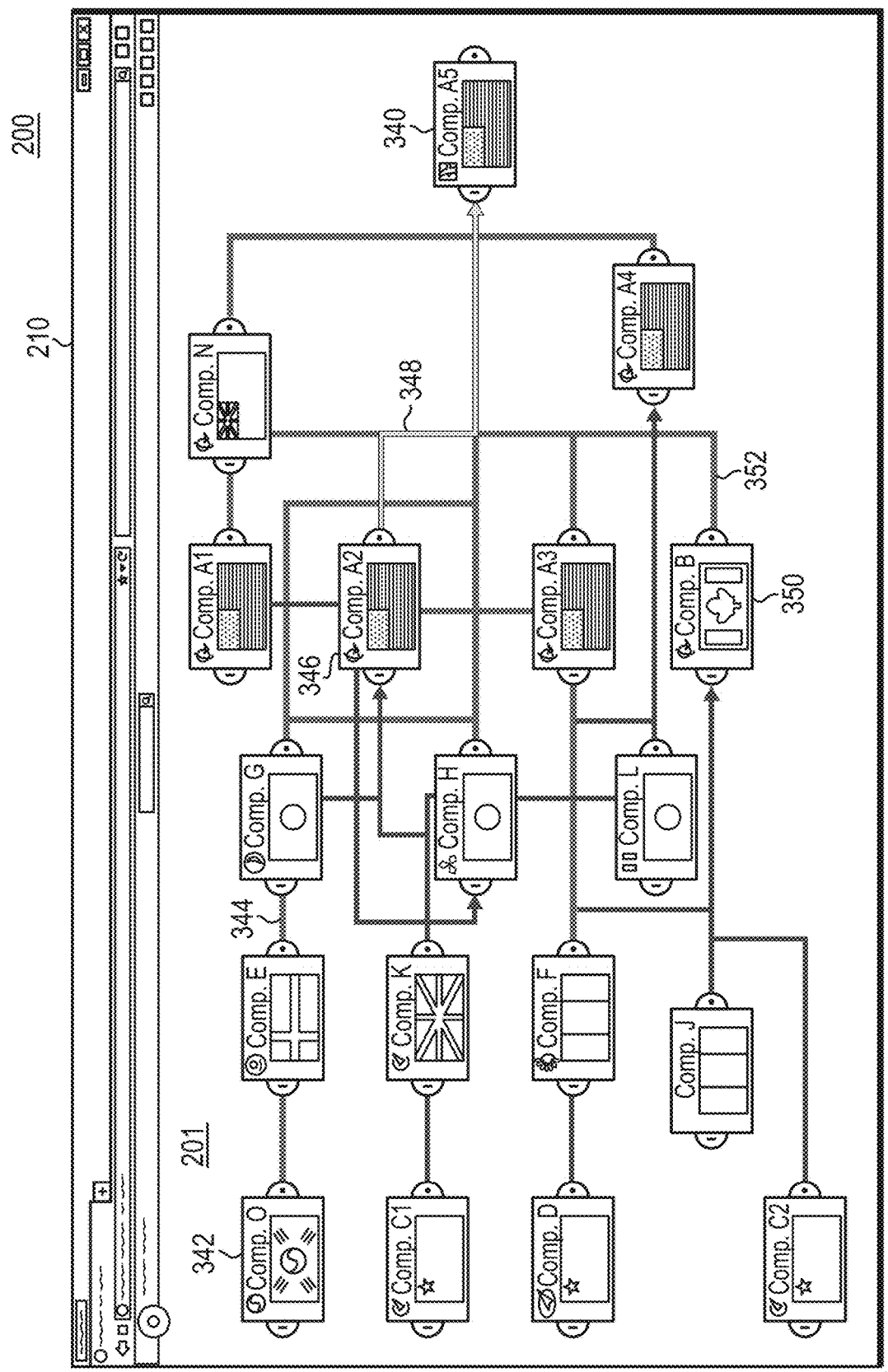

FIG. 3A-3C depicts identification and assessment of supply chain risk using a visual model 201 as provided by the example modeling system 200 of FIG. 2. FIG. 3A illustrates an example embodiment in which the modeling engine 234 graphically identifies (in the visual model 201 on user interface 210) total probabilistic risk values determined by the risk quantification engine 236 for each given logical station (e.g., logical stations 211, 213, 215, 216). Specifically, in FIG. 3A, the modeling engine 234 generates a visual model 201 of a supply chain network, which the modeling engine 234 displays on user interface 210. The visual model 201, as displayed on user interface 210 by the modeling engine 234, includes logical station 211 representing a supplier site for Company E, logical station 215, 213 representing supplier manufacturing (OEM) sites for Company F and the organization (Company A1, which indicates company A located at facility 1), and logical station 216 representing an end-product manufacturing site of the organization (Company A4, which indicates company A located at facility 4). The visual model 201, displayed on user interface 210 by the modeling engine 234, further includes logical transit 212 representing the transportation between the logical station 211 (supplier site) and the logical station 213 (OEM site), and logical transit 214 representing the transportation between the logical station 213 (OEM site) and the logical station 216 (end-product manufacturing site).

For logical station 216, the visual model 201 also includes, as part of the supply chain network, the internal end-to-end flow of materials 310 for manufacturing the delivered end-product within the end-product manufacturing site represented by logical station 216. In regards to the internal end-to-end flow of materials 310, the visual model 201, as displayed on user interface 210 by the modeling engine 234, includes internal logical station 312 representing a receiving area, internal logical station 314 representing an inventory area, internal logical stations 316 representing an assembly area, and internal logical station 318 representing an painting and dispatching area of the end-product manufacturing site represented by logical station 216. The visual model 201, displayed on user interface 210 by the modeling engine 234, further includes internal logical transit 313 representing the transportation between the internal logical station 312 (receiving area) and the internal logical station 314 (inventory area), internal logical transit 315 representing the transportation between the internal logical station 314 (inventory area) and the internal logical station 316 (assembly area), and the internal logical transit 317 representing the transportation between the internal logical station 316 (assembly area) and the internal logical station 318 (painting and dispatching area). The visual model 201 may similarly include the internal flow of materials 310 for some or all of the logical stations depicted in the visual model 201.

For each logical station depicted in the visual model 201 displayed on user interface 210, the modeling engine 234 communicates with the risk quantification engine 236 to identify risk associated with the respective logical station. For example, the modeling engine 234 communicates with the risk quantification engine 236 to identify the total risk for the supplier site represented by logical station 211 as the probabilistic value (P) of 0.0001. Specifically, the modeling engine 234 enables the user to place the logical station 211 into the supply chain network on user interface 210 and assign details to the logical station 211, such as assigning the geolocation of the represented site as Sweden (as indicated by the display of the Swedish flag on the logical station 211). When the user assigns the geolocation to logical station 211, the modeling engine 234 may communicate the geolocation information to the risk quantification engine 236, which in turn may then access data regarding the geolocation to determine uncertainties (e.g., in real-time), associated with the site represented by logical station 211. That is, the risk quantification engine 236 accesses pertinent data from external data sources 220 (e.g., aggregators such as Maplecroft, Reuters, and the like), or any other public or private data sources, regarding the conditions of the geolocation (i.e., a particular geolocation in Sweden), such as environmental, geopolitical, economic, technological, and any other such conditions. The risk quantification engine 236 may also access data from external data sources 220 (e.g., aggregators such as Maplecroft, Reuters, and the like), or any other public or private data sources, regarding other conditions surrounding the end-product, such as marketing data regarding trends in the market. If the modeling engine 234 also determines that production data was stored in the Enterprise Knowledgebase 2155 for the company associated with the logical station 211, the risk quantification engine 236 also accesses this production-related data from the Enterprise Knowledgebase 2155 for the respective company. In the example embodiment of FIG. 3A, logical station 211 represents a supplier site for which there is no production-related data stored in the Enterprise Knowledgebase 2155.

The risk quantification engine 236 applies uncertainty factors related to one or more categories of risk to the accessed data (e.g., retrieved from external data sources 220) to determine the probabilistic value (P) of 0.0001 for the site represented by logical station 211. For example, the risk quantification engine 236 may apply the uncertainty factors associated with sourcing risk for the supplier site location in Sweden, such as geopolitical uncertainty factors (e.g., political instability, trade restrictions, terrorism, corruption, theft, illiteracy, trade activity, piracy, and the like), geo-economic uncertainty factors (e.g., demand shocks, price volatility, currency fluctuation, energy shortages, and the like), and geo-technical uncertainty factors (network infrastructure failures, ICT disruptions, and the like) to the accessed data. The risk quantification engine 236 may apply one or more of these uncertainty factors using probabilistic analysis techniques, such as fault tree analysis, to determine (identify) a probabilistic value for the sourcing risk associated with logical station 211. The risk quantification engine 236 may similarly apply the uncertainty factors associated with environmental risk for the site in Sweden, such as natural disasters, extreme weather, pandemics, and such, that have occurred (or are predicted to occur) at the location of the supplier in Sweden, to the accessed data to determine a probabilistic value for environmental risk.

Further, the risk quantification engine 236 may apply the uncertainty factors associated with planning risk associated with the material supplied at the supplier site represented by logical station 211, such as seasonality, new competitor products, short-lived enthusiasm for an end-product, distortion of demand, and the like, of the end-product being produced from these supplied materials, to the accessed data to determine a probabilistic value for planning risk. The determined value for each risk category (e.g., sourcing risk, environmental risk, and planning risk) may then be probabilistically calculated, which may include each category given a particular weight in the probabilistic calculation, into a total risk value (P=0.0001) for the logical station 211. In some embodiments, the uncertainty factors for these different risk categories may instead be applied together (e.g., using a fault tree analysis or other probabilistic analysis technique) to determine the total probabilistic value (P=0.0001) for the logical station 211.

Similarly, the modeling engine 234 communicates with the risk quantification engine 236 to identify the total risk for the OEM site represented by logical station 213 to be the probabilistic value (P) of 0.0001. The risk quantification engine 236 may similarly access data for the OEM site represented by logical station 213 from external data sources 220. Even through the site represented by logical station 213 is a supplier manufacturing site, production data for the company is not available in the Enterprise Knowledgebase 2155 (but may be accessed for other OEM sites). The risk quantification engine 236 may determine a probabilistic value for the sourcing risk and the environmental risk associated with logical station 213 based on applying respective uncertainty factors to the accessed geolocation data of the represented site in Italy for example (as described in regards to logical stations 211). The risk quantification engine 236 may further determine a probabilistic value for the planning risk based on applying respective uncertainty factors to the accessed marketing data associated with the material manufactured at the OEM site represented by logical station 213 (as described in regards to logical stations 211). In determining the probabilistic values for sourcing risk, environmental risk, and planning risk for logical station 213, the risk quantification engine 236 may also apply the respective uncertainty factors to the accessed data relative to logical station 211, as the supply uncertainty at logical station 211 affects the supply uncertainty at logical station 213 (which depends on the flow of materials from logical station 211).

In addition, as the OEM site represented by logical station 213 receives materials from the supplier site represented by logical station 211 (via transportation represented by logical transit 212), the risk quantification engine 236 may also apply uncertainty factors associated with delivery risk to the accessed data. That is, the risk quantification engine 236 may apply uncertainty factors to accessed data associated with transporting (logical transit 212) the material supplied from the supplier site in Sweden (logical station 211) to the OEM site in Italy (logical station 213), such as the method of transportation (e.g., freight train, ship, plane, truck, and the like) between the two sites, the fixtures required for transporting the materials using the transportation method (e.g., tank, cooling system, heating system, lifts, racks, and the like), and the geolocation of the transportation (e.g., trade restrictions, theft, piracy, border delays, energy shortages, communication disruptions, and the like) to determine a probabilistic value for delivery risk. The determined value for each risk category (e.g., sourcing risk, environmental risk, planning risk, and delivery risk) may then be probabilistically calculated, which may include each category given a particular weight in the probabilistic calculation, into a total risk value (P=0.0001) for the logical station 213. In some embodiments, the uncertainty factors for these different risk categories may instead be applied together (e.g., using a fault tree analysis or other probabilistic analysis technique) to determine the total probabilistic value (P=0.0001) for the logical station 213.

Similarly, the modeling engine 234 communicates with the risk quantification engine 236 to identify the total risk for the end-product manufacturing site represented by logical station 216 to be the probabilistic value (P) of 0.1. The risk quantification engine 236 may similarly access data for the end-product site represented by logical station 216 from external data sources 220. The risk quantification engine 236 may similarly access data for the end-product site represented by logical station 216 from the Enterprise Knowledgebase 2155, as the logical station 216 represents the site of a company which also uses the modeling system 200, and in which, the modeling system 200 has collected and stored at least one of supplier and production data in the Enterprise Knowledgebase 2155. The risk quantification engine 236 may determine a probabilistic value for the sourcing risk and the environmental risk associated with logical station 216 based on the accessed data regarding the geolocation of the represented site in the United States (as described in regards to logical stations 211 and 213). The risk quantification engine 236 may further determine a probabilistic value for the planning risk associated with the material manufactured/supplied at the OEM site represented by logical station 216 (as described in regards to logical stations 211 and 213). The risk quantification engine 236 may further determine a probabilistic value for the delivery risk associated with transporting (logical transit 214) the material supplied/manufactured from OEM site in Italy (logical station 213) to the end-product site in the United States (logical station 216), to determine a probabilistic value for delivery risk (as described in regards to logical stations 211, 213).

In determining the probabilistic values for sourcing risk, environmental risk, and planning risk for logical station 216, the risk quantification engine 236 may also apply the respective uncertainty factors to the accessed data relative to logical stations 211 and 213, as the supply uncertainty at logical stations 211 and 213 affects the supply uncertainty at logical station 216 (which depends on the flow of materials from logical stations 211 and 213). Further, in determining the probabilistic values for delivery risk for logical station 216, the risk quantification engine 236 may also apply the respective uncertainty factors to the accessed data relative to logical transit 212, as the delivery uncertainty at logical transit 212 affects the delivery uncertainty at logical station 216 (which depends on the transportation of materials from logical stations 211 to 213). In addition, as production data for the end-product site represented by logical station 216 is accessible from the Enterprise Knowledgebase 2155, the risk quantification engine 236 may also apply the accessed data to uncertainty factors associated with production risk. Note, the accessed production data may include the specific production plans, resources, and processes used internal to the end-product manufacturing site to produce the end end-product. For example, the production data may comprise the specific production plans, resources, and processes used at one or more of the internal areas of the represented end-product manufacturing site represented by logical station, as depicted by logical stations 312 (modeled receiving area), 314 (modeled inventory area), 316 (modeled assembly area), and 318 (modeled painting and dispatching area).

This access production data is applied to the uncertainty factors associated with the risk of failure or delay in production at the site represented by logical station 216, such as processing capabilities, processing variations, changes in processing technology, changes in processing costs, and the like, to determine a probabilistic value for delivery risk. In determining the probabilistic values for the production risk for the end-product manufacturing site modeled by logical station 216, the accessed production data for a respective area within the site may be applied to the uncertainty factors to determine the risk or uncertainty of that respective area. For example, the accessed production data (e.g., plans, resources, processes, and such) for logical station 312 may be used to determine the production risk associated with the respective receiving area modeled by logical station 312 as P=0.01. Similarly, the accessed production data (e.g., plans, resources, processes, and such) for logical station 314, along with the production data downstream logical station 312 and logical transit 313, which affect the uncertainty associated with logical station 314, may be used to determine the production risk associated with the respective inventory area modeled by logical station 312 as P=0.01. Similarly the accessed production data for the other logical stations of the internal flow of materials 310 may be used to determine the production risk associated with the respective physical area of the end-product manufacturing plant represented by logical station 216. The determined probabilistic value for each production area may then be probabilistically calculated, which may include each given production area a particular weight in the probabilistic calculation, into a probabilistic value for production risk of the entire end-product manufacturing site represented by logical station 216. In some embodiments, the uncertainty factors for the different production areas may instead be applied together (e.g., using a fault tree analysis or other probabilistic analysis technique) to determine the probabilistic value for production risk of the entire end-product manufacturing site represented by logical station 216.

The determined value for each risk category (e.g., sourcing risk, environmental risk, planning risk, delivery risk, and production risk) for the entire end-product manufacturing site modeled by logical station 216 may then be probabilistically calculated, which may include each category given a particular weight in the probabilistic calculation, into a total risk value (P=0.1) for the logical station 216. In some embodiments, the uncertainty factors for these different risk categories may instead be applied together (e.g., using a fault tree analysis or other probabilistic analysis technique) to determine the total probabilistic value (P=0.1) for the logical station 216.

FIG. 3B illustrates a different embodiment of the visual model 201 shown in FIG. 3A. In the embodiment of FIG. 3B, the modeling engine 234 designates a visual indication for the total probabilistic risk value determined (by risk quantification engine 236) for a given logical station (e.g., logical stations 211, 213, 215, 216) as described in reference to FIG. 3A. Specifically, the modeling engine 234 compares the determined total probabilistic risk value for a given logical station to a risk tolerance threshold value. If the determined total probabilistic risk value is within a first range (e.g., range of probability 0.00001 to 0.001) of the risk tolerance threshold value, the modeling engine 234 designates a first visual indication to the respective logical station, which is presented in the visual model 201 on the user interface 210. For example, the risk quantification engine 236 determines that the total probabilistic risk value for logical station 211 and logical station 213 are both P=0.0001 (as shown in FIG. 3A), which is within a first range of the risk tolerance threshold value (i.e., represents a lower risk level). As such, the modeling engine 234 designates a first visual indication to the respective logical stations 211 and 213, which in the embodiment of FIG. 3B, comprises visually indicating a green light on the displayed traffic light graphic for the respective logical stations 211 and 213.

If the determined total probabilistic risk value is within a second range (e.g., range of probability 0.001 to 0.1) of the risk tolerance threshold value, the modeling engine 234 designates a second visual indication to the respective logical station, which is presented on in the visual model 201 on the user interface 210. For example, the risk quantification engine 236 determines that the total probabilistic risk value for logical station 216 is P=0.1 (as shown in FIG. 3A), which is within the second range of the risk tolerance threshold value (i.e., represents a moderate risk level). As such, the modeling engine 234 designates the second visual indication to the logical station 216, which in the embodiment of FIG. 3B, comprises visually indicating a yellow light on the displayed traffic light graphic for the respective logical station 216. Further, if the determined total probabilistic risk value is within a third range (e.g., range of probability 0 to 0.1) of the risk tolerance threshold value, the modeling engine 234 designates a third visual indication to the respective logical station, which is presented on in the visual model 201 on the user interface 210. For example, the risk quantification engine 236 determined that the total probabilistic risk value for logical station 218 is P=0.5, which is within the third range of the risk tolerance threshold value (i.e., represents a high risk level). As such, the modeling engine 234 designates the third visual indication to the logical station 218, which in the embodiment of FIG. 3B, comprises visually indicating a red light on the displayed traffic light graphic for the respective logical station 218.

In some embodiments, at least one of the risk tolerance threshold value and range of risk tolerances from the tolerance threshold value are specified by a user by a graphical tool displayed on the user interface 210 or other tools provided by the modeling system 200. In other embodiments, at least one of the risk tolerance threshold value and range of risk tolerances from the tolerance threshold value are automatically calculated by the modeling engine 234 based on specific constraints on the end-product (which may be determined from related data collected and stored in the Enterprise Knowledgebase 2155, data retrieved from external data sources 220, or any other public or private data accessible by the subject organization). Further, in the embodiment of FIG. 3B, the modeling engine 234 determines three ranges of risk tolerances relative to the risk tolerance threshold value, but in other embodiments, the modeling system 200 may include any number of ranges (levels) of risk tolerances. In addition, in the embodiment of FIG. 3B, the modeling engine 234 visually indicates the designated risk as a light color on a displayed traffic light graphic, but in other embodiments, the modeling engine 234 may visually or otherwise indicate the designated risk for a given logical station in any manner known in the art. In some embodiments, the modeling engine 234 may continuously monitor the visual model 201 on the user interface 210 to automatically update the visual effects of the visual model 201 (e.g., designate risk for a logical station in color) to provide continued visibility and traceability of respective risk related to the logical station, as the modeling engine 234 detects or otherwise determines the changing risk (e.g., in real-time)

Further, in the embodiment of FIG. 3B, the modeling engine 234 generates a detailed graphical profile 330 (e.g., pie chart) visually comparing the determined risk values for the respective set of risk categories for each logical station. In some embodiments, the modeling engine 234 may compare the determined risk values as percentages, such that the category of risk is displayed as the percentage that the category risk (based on its determined risk value, which may or may not be weighted) contributed to the determined total risk for the given logical station. In other embodiments, the modeling engine 234 may compare the determined risk values using any other probabilistic analysis, technique, calculation, and representation known in the art (e.g., fault tree analysis). The modeling engine 234 further enables the user to display the graphical profile 330 at the respective logical station, as displayed by a user at logical station 216 of FIG. 3B, by selecting the logical station (e.g., clicking the respective displayed graphical traffic light). Note, in the embodiment of FIG. 3B, the modeling engine 234 generates the compared determined risk values for the set of risk categories as a pie chart, but in other embodiments, the modeling engine 234 may graphically or otherwise indicate these determined risk values (and any other details related to the risk associated with the given logical station) in any manner known in the art.

FIG. 3C illustrates a different embodiment of the visual model 201 shown in FIGS. 3A and 3B. In the embodiment of FIG. 3C, based on the determined total probabilistic risk value for a given logical station and logical transit, the modeling engine 234 determines the total probabilistic risk associated with each supply chain path from a given logical station to each respective upstream logical station in the supply chain network. In other embodiments, the modeling engine 234 determines a category of probabilistic risk (e.g., sourcing risk, environmental risk, planning risk, delivery risk, production risk, and such) associated with each supply chain path from a given logical station to each respective upstream logical station in the supply chain network. The modeling engine 234 enables a user to select a logical station in the modeled supply chain network, and the modeling engine 234 (in the visual model 201 on the user interface 210) will visually indicate the different paths flowing materials to the selected logical station. The visual indication is based on the risk contributed by each of the respective different paths, in providing respective materials to the selected logical station for supplying/producing a component material or end-product. The modeling engine 234 (in the visual model 201 on the user interface 210) will further visually indicate the critical path, contributing the highest probabilistic risk (e.g., based on total risk or a particular risk category) in providing respective materials to the selected logical station for supplying/producing the a component material or end-product. In some embodiments, the modeling engine 234 may continuously monitor the visual model 201 on the user interface 210 to automatically update the visual effects of the visual model 201 (e.g., highlighting logical transits in color) to provide continued visibility and traceability of respective critical information (e.g., risk) related to the logical transits, as the modeling engine 234 detects or otherwise determines the changing critical information.

For example, in the embodiment of FIG. 3C, the user selects the logical station 340 modeling the end-product manufacturing site for the organization. The modeling engine 234 (in the visual model 201 on the user interface 210) visually indicates the different paths flowing materials to logical station 340, based on the risk contributed by each of the respective different paths. In FIG. 3C, modeling engine 234 visually indicates (highlights) most of the supply chain paths from other downstream logical stations to logical station 340 as green, as most of the supply chain paths contribute a low level of risk in providing respective materials to the end-product manufacturing site (modeled by logical station 340) for producing the end-product. For example, the path 344 from logical station 342, modeling a supplier site of Company O, and the path 352 from logical station 350 (a supplier site of Company B) are green, as they each contribute a low level of risk in providing materials to logical station 340 for producing the end-product. The modeling engine 234 (in the visual model 201 on the user interface 210) further visually indicates (highlights) in yellow the critical path, which contributes the highest total probabilistic risk (e.g., a moderate risk in FIG. 3C), in providing respective materials to the end-product manufacturing site (modeled by logical station 340) for producing the end-product. For example, the path 348 from logical station 346 (OEM site for Company A2, which indicates company A located at facility 2), modeling a OEM site, to logical station 340 is yellow because path 348 contributes the highest total probabilistic risk (e.g., moderate risk), in providing respective materials to the end-product manufacturing site (modeled by logical station 340) for producing the end-product. Note, in the embodiment of FIG. 3C, the modeling engine 234 highlights contributing paths (including a critical path) in different colors representative of risk levels, but in other embodiments, the modeling engine 234 may graphically or otherwise indicate contributing paths (including one or more critical paths) in any manner known in the art.

Example Method for Assessing Risk in a Supply Chain Network

Figure 4:
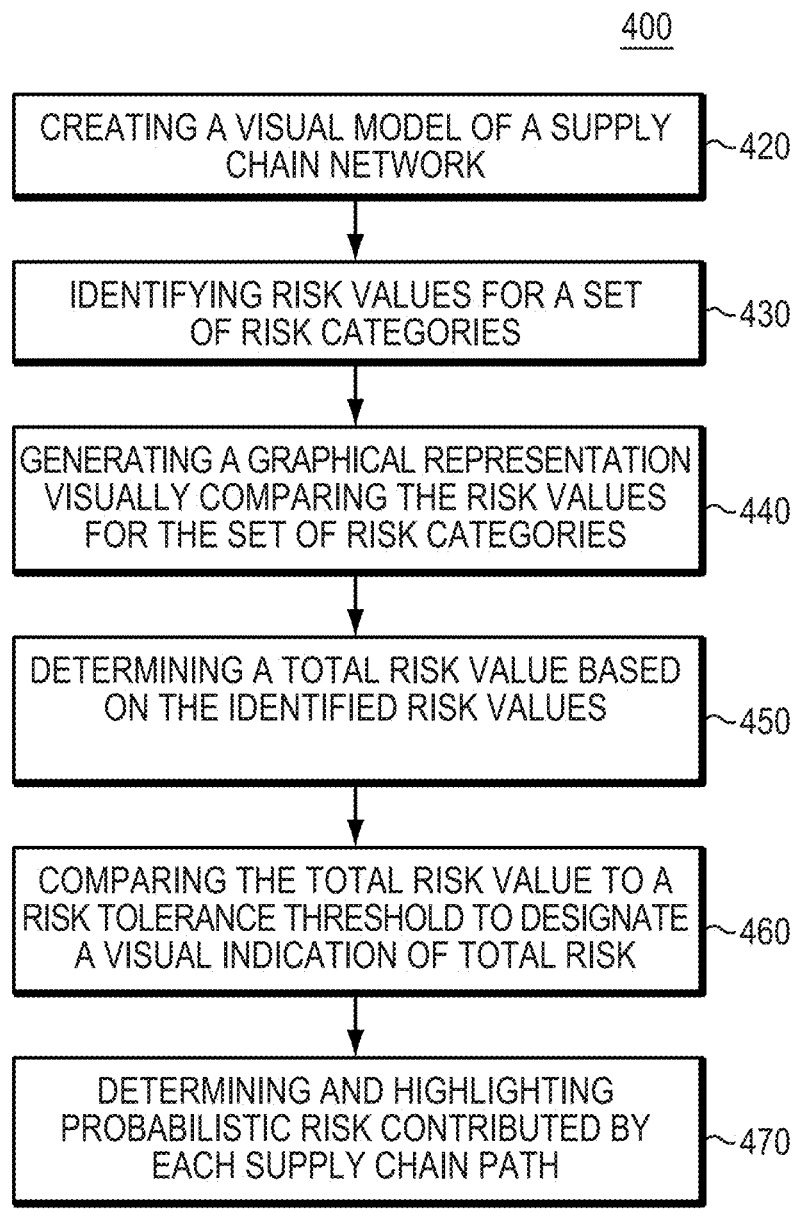
FIG. 4 is a flowchart of an example method for modeling a supply chain network in embodiments of the present invention.

FIG. 4 is a flowchart of an example method 400 for modeling supply chain risk in embodiments of the present invention. In some embodiments, the method 400 may be executed as part of a supply chain modeling system 200 as shown in FIG. 2. The method 400 begins at step 420 by creating, and storing in computer memory (such as an Enterprise Knowledgebase 2155 of FIG. 2), a visual model 201 of a supply chain network. The visual model 201 includes one or more logical stations graphically representing physical sites (e.g., supplier sites, supplier manufacturing sites, end-product manufacturing sites, storage sites, distribution sites, retail sites, and such) in the supply chain network. Note, the logical stations may further include one or more internal logical stations graphically representing physical areas within (internal to) a physical manufacturing site modeled by a logical station. As part of storing a logical station, the method 400, step 420, may store data assigned to the logical station to define the modeled site, such as geolocation, associated company, type of site or site area, plans executed by the site or area, processes executed by the site or area, and resources used by the site or area. The visual model 201 also includes one or more logical transits graphically representing transportation of materials between the modeled sites. Note, the logical transits may include one or more internal logical transits graphically representing physical transportation within a manufacturing site modeled by a logical station.

The method 400, at step 430, then identifies risk for each given logical station that graphically represents a site in the supply chain network. For each given logical stations, the method 400, at step 430, identifies risk values for a set of risk categories associated with the given logical station. The method 400, at step 430, determines the identified risk values based on physical conditions related to: (a) the physical site represented by the given logical station, (b) each physical site represented by a respective logical station positioned in a downstream supply chain path to the given logical station, and (c) each transportation represented by a respective logical transit positioned in the downstream supply chain path. For example, the risk value for a risk category associated with a logical station representing an OEM site in the visual model 201 of the supply chain network may be based on physical conditions associated with the given OEM site, a downstream site supplying to the OEM site, and the transportation between the OEM site and downstream supplier site.

Specifically, the risk categories may include sourcing risk, environment risk, planning risk, delivery risk, and production risk. For each given logical station, the method 400, step 430, may determine the probabilistic risk value for a given risk category by applying respective uncertainty factors to data accessed for the given site (e.g., from external data sources 220 of FIGS. 2 and 3A, from Enterprise Knowledgebase 2155 of FIGS. 2 and 3A, or other such public or private data sources). This accessed data for a given site defines the physical conditions of the given site, the physical conditions of each downstream site positioned in the supply chain path to the given site, and the physical conditions of the transportation between these sites. For example, the method 400, step 430, may determine a sourcing risk for a given logical station by applying geopolitical uncertainty factors (e.g., political instability, trade restrictions, terrorism, corruption, theft, illiteracy, trade activity, piracy, and the like), geo-economic uncertainty factors (e.g., demand shocks, price volatility, currency fluctuation, energy shortages, and the like), and geo-technical uncertainty factors (network infrastructure failures, ICT disruptions, and the like) to the accessed geolocation data for the given site. The method 400, step 430, may apply some or all of these uncertainty factors to the accessed geolocation data for the given site by the use of probabilistic analysis techniques, such as fault tree analysis, to determine (identify) a probabilistic value for sourcing risk.

The method 400, at step 430, may similarly apply accessed data regarding the same or other physical conditions associated with the site represented by the given logical station to identify (determine) a probabilistic value respective to environmental risk, delivery risk, planning risk, productions risk, and other such risk categories, for the given logical station. In some of these embodiments, the uncertainty factors may be applied to the given site, each downstream site positioned in the supply chain path to the given site, and the transportation between these sites, together in one analysis to determine a cumulative probabilistic value for each category of risk for the given site. In other of these embodiments, the uncertainty factors may be applied separately to the given site, and each of the downstream sites and the transportation between these sites, to determine separate probabilistic values for each site, which are then probabilistically calculated (and, in some embodiments, weighed, or otherwise adjusted) to generate a cumulative probabilistic value for each category of risk for the given site.

The method 400, at step 440, then generates a graphical representation visually comparing the identified risk values for each of the set of risk categories. In some embodiments, the method 400, step 440, compares the identified risk values as percentages, such that the identified probabilistic value for each risk category associated with the given logical station is displayed relative in percent to the identified probabilistic values associated with each of the other risk categories for the given site. In other embodiments, the method 400, step 440, visually compares the identified risk values using any other probabilistic or mathematical method known in the art. In some embodiments, the method 400, step 440 applies weighing to some or all of the probabilistic values for the respective risk categories prior to visually comparing these identified risk values. The method 400, step 440, then displays the visual comparison in graphical representation (e.g., as a graph, chart, table, or any other graphical representation known in the art) at the given logical station in the visual model 201.

The method 400, at step 450, next, determines a total risk value based on the identified risk values for the respective risk categories. In some embodiments, the method 400, step 450, applies the uncertainty factors for each of the risk categories for the given site together in one analysis to probabilistically calculate a total probabilistic risk value (assessed level of risk) for a given site. In other embodiments, the probabilistic risk value determined for each respective risk category may be calculated (and, in some embodiments, weighted or otherwise adjusted) to generate the total probabilistic risk value (assessed level of risk) for the given site. The method 400, then, at step 460 compares the determined total probabilistic risk value for a given logical station to a defined risk tolerance threshold value. Note, the risk tolerance threshold value may be defined as the same value for all the logical stations in the modeled supply chain network, may be defined according to the type of site (e.g., supplier site, supplier manufacturer site, and such), or may be defined individually for each given logical station (e.g., when assigning data to the logical station). The method 400, step 460, may compare the total probabilistic risk value to the risk tolerance threshold to calculate the distance (difference) between the total probabilistic value and the risk tolerance threshold value. The method 400, step 460, may compare the calculated distance to a set of tolerance ranges that specify probabilistic or mathematical distances from the risk tolerance threshold value. Based on the range of the set of ranges in which the calculated distance falls, the method 400, step 460, designates a visual indication to the respective logical station in the visual model 201. For example, as described in FIG. 3B, that visual indication may be a color presented on a traffic light graphic display.

Based on the identified risk values for a given logical station, the method 400, at step 470, also determines probabilistic risk contributed by each downstream supply chain path for the given logical station. The method 400, step 470, may determine the contributed risk relative to either total probabilistic risk or one or more categories of probabilistic risk calculated for each logical station (and logical transit) in the supply chain path to the given logical station. The method 400 then visually indicates (e.g., highlight in a designated color or other such marking) the respective level of risk contributed by each downstream supply chain path for the given logical station. The method 400, step 470, may determine the respective level of risk using the same or different risk tolerance threshold and set of tolerance ranges as used in designing a visual indication to a logical station. The method 400, step 470, may next determine the critical supply chain path that contributes the highest probabilistic risk to the given logical station, relative to either total probabilistic risk or one or more categories of probabilistic risk. The method 400, step 470, then, visually indicates (e.g., highlight in a designated color or other such marking) the supply chain path with the respective highest probabilistic risk in the displayed visual model 201.

The method 400 displays the visual model 201 having the generated graphical representations at respective logical stations and having the designated visual indications at respective logical stations in a computer screen view (e.g., user interface 210 of FIGS. 2, 3A-3C). The displayed visual model 201 provides risk identification and assessment of the modeled supply chain network. In some embodiments, the modeled supply chain network (as depicted in the visual model 201) may be output, including identified risk, in a format (e.g., signals) to program control systems for the physical sites or physical transportation modeled in the supply chain network, or to program other modeling systems that control the operation of the physical sites or the physical transportations, to effect the operations of these physical sites or physical transits.

Digital Processing Environment

Figure 5:
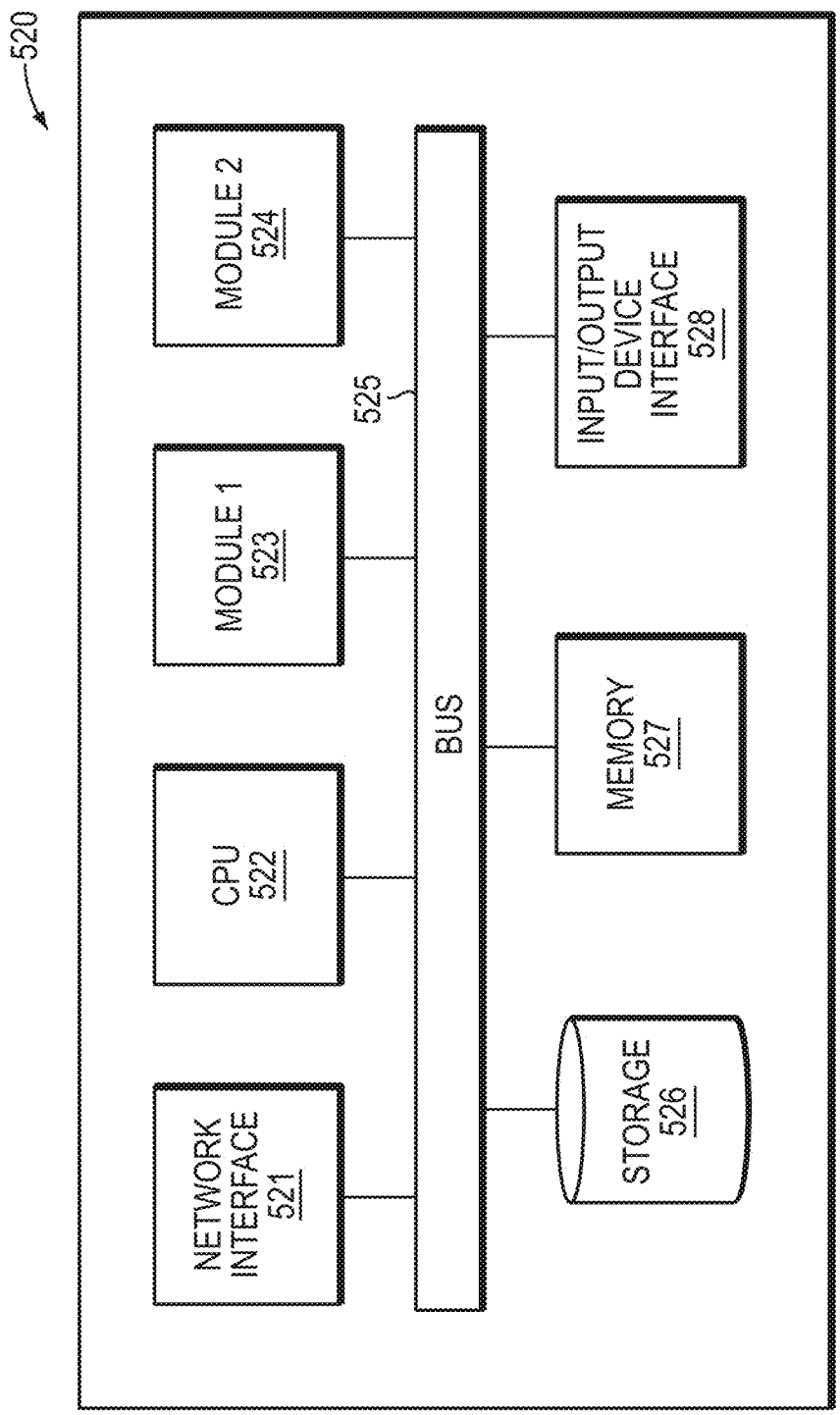
FIG. 5 is a block diagram of a computer (or digital processing) system for visually modeling supply chain networks, and identifying and assessing risk in the supply chain networks, in at least one embodiment of the present invention.

FIG. 5 is a simplified block diagram of a computer-based system 520 that may be used to assess risk in a supply chain network according to an embodiment of the present invention. The system 520 comprises a bus 525. The bus 525 serves as an interconnector between the various components of the system 520. Connected to the bus 525 is an input/output device interface 528 for connecting various input and output devices such as a keyboard, mouse, display, speakers, etc. to the system 520. A central processing unit (CPU) 522 is connected to the bus 525 and provides for the execution of computer instructions. Memory 527 provides volatile storage for data used for carrying out computer instructions implementing method 400 and/or modules 234 and 236 for modeling a supply chain network, as detailed in FIGS. 2-4. Storage 526 provides non-volatile storage for software instructions, such as an operating system (not shown). In particular, memory 527 and/or storage 526 are configured with program instructions implementing the method 400 for identifying and assessing risk detailed above in FIG. 4, and the user interfaces of FIGS. 3A-3C. The system 520 also comprises a network interface 521 for connecting to any variety of networks known in the art, including cloud, wide area networks (WANs) and local area networks (LANs).

Further connected to the bus 525 is a first module 523. The first module 523 is configured to load a supply chain network as a visual model 201 on a user interface. The first module 523 may provide loading functions through any means known in the art. For example, the first module 523 may reference supply chain data from an Enterprise Knowledgebase (e.g., 2155 of FIGS. 2 and 3A) that is stored on the storage device 526 or memory 527 (e.g., from an Enterprise Knowledgebase 2155 of FIGS. 2 and 3A). For further example, the first module 523 may load the supply chain data from any point communicatively coupled to the system 520 via the network interface 521 and/or input/output device interface 528 (e.g., from external data aggregators 220 of FIGS. 2 and 3A).

The system 520 further comprises a second module 524 that is communicatively/operatively coupled to the first module 523. The second module 524 is configured to identify supply chain risk, in real-time, for display on the visual model 201 of the supply chain network. The second module 524 may provide risk identification functions through any means known in the art. For example, the second module 524 may store risked related data for the supply chain network on the storage device 526 or memory 527. For another example, the second module 524 may probabilistically calculate the identified risk according to various risk categories by means of the CPU 522 via the bus 525. For further example, the second module 524 may retrieve geolocation-related risk data for a particular supplier location from any point communicatively coupled to the system 520 via the network interface 521 and/or input/output device interface 528.

It should be understood that the example embodiments described herein may be implemented in many different ways. In some instances, the various methods and machines described herein may each be implemented by a physical, virtual, or hybrid general purpose computer, such as the computer system 520. The computer system 520 may be transformed into the machines that execute the methods described herein, for example, by loading software instructions into either memory 527 or non-volatile storage 526 for execution by the CPU 522. Further, while the first module 523 and second module 524 are shown as separate modules, in an example embodiment these modules may be implemented using a variety of configurations.

The system 520 and its various components may be configured to carry out or implement the modules 234 and 236, user interface, and/or method 400 described hereinabove in relation to FIGS. 2-4, respectively. For example, the system 520 may be configured to carry out the method 400 described hereinabove in relation to FIG. 4, and the supporting user interfaces of FIGS. 2 and 3A-3C. In an example embodiment, the first module 523 and second module 524 may be implemented in software that is stored on the memory 527 and/or storage device 526. In such an example embodiment, the CPU 522 and the memory 527 with computer code instructions stored on the memory 527 and/or storage device 526 implement the first module 523 that loads a supply chain network as a visual model 201 and operates as described previously for modeling engine 234. Further, the components of the system 520 implement the second module 524 that is operatively coupled to the first module 523 and configured to identify supply chain risk, in real-time, for display on the visual model 201 of the supply chain network as described previously for risk quantification engine 236.

Figure 6:
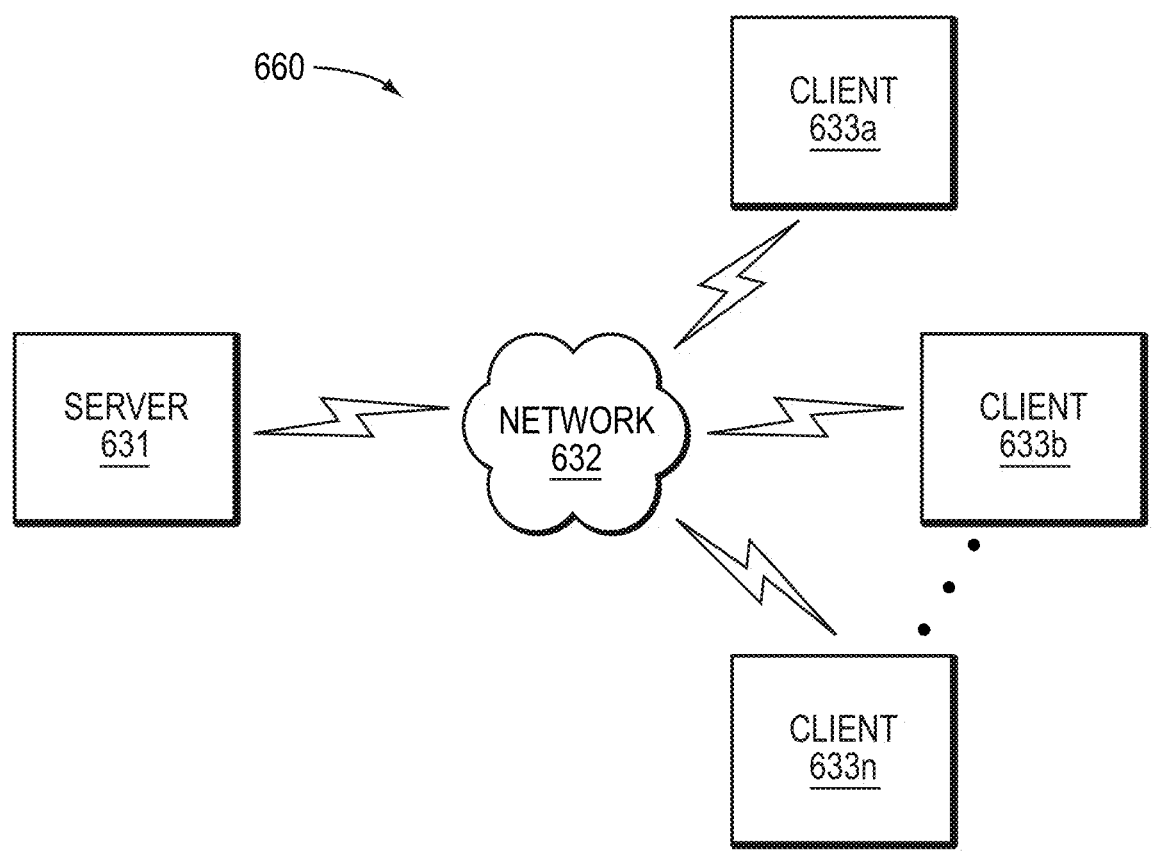
FIG. 6 is a schematic diagram of an example computer network environment in which embodiments of the present invention may be implemented.

FIG. 6 illustrates a computer network environment 660 in which an embodiment of the present invention may be implemented. In the computer network environment 660, the server 631 is linked through the communications network 632 to the clients 633a-n. The environment 660 may be used to allow the clients 633a-n, alone or in combination with server 631, to execute any of the methods and/or modules (e.g., method 400 and/or modules 234 and 236, and user interfaces thereof of FIGS. 2-4 described hereinabove). The environment 660 may comprise the supply chain modeling system 200 (e.g., DELMIA 3DEXPERIENCE) of FIG. 2. It should be understood that the example embodiments described above may be implemented in many different ways. In some instances, the various methods and machines described herein may each be implemented by a physical, virtual, or hybrid general purpose computer, or a computer network environment such as the computer environment 660.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for controlling operations of physical sites based on modeling of a supply chain network including the physical sites, the method comprising:
    creating, storing in memory, and continuously monitoring and updating a visual model of a supply chain network, the created visual model including: (i) one or more logical stations graphically representing physical sites in the supply chain network, the physical sites including a manufacturing site, and (ii) one or more logical transits graphically representing transportation of materials between the represented physical sites;
    for each given logical station that graphically represents a physical site, using a processor and implementing:
        automatically identifying risk values in real time for each risk category in a set of risk categories associated with the given logical station, the risk categories including at least a risk associated with materials and a risk associated with resource usage and flow between physical areas internal to a modeled manufacturing site, the identifying determining the risk values based on physical conditions related to: (a) the physical site represented by the given logical station, (b) each physical site, of a plurality of physical sites, represented by a respective logical station positioned in a downstream supply chain path to the given logical station, and (c) each transportation represented by a respective logical transit positioned in the downstream supply chain path,
        generating a graphical representation visually comparing the identified risk values for each risk category in the set of risk categories of the given logical station, the graphical representation being displayed at the given logical station in the visual model,
        automatically determining a total risk value for the given logical station based on the identified risk values for each risk category in the set of risk categories, wherein the determining designates a visual indication of the determined total risk value based on comparing the determined total risk value to a set of tolerance ranges that specify probabilistic distance of the determined total risk value from a risk tolerance threshold, the designated visual indication being presented at the given logical station in the visual model;
    displaying in a computer screen view, the visual model having the generated graphical representations at respective logical stations and having the designated visual indications at respective logical stations, said displayed visual model providing risk assessment in the modeled supply chain network;
    automatically updating the visual model to minimize associated risk in the modeled supply chain network; and
    outputting a signal to automatically control operations of the physical sites by automatically programming control systems for the physical sites, automatically programming the transportation modeled in the supply chain network, or automatically programming other modeling systems that control operation of the physical sites or the transportation of materials between the physical sites.

2. The method of claim 1, wherein the set of risk categories further includes at least one of: environmental risk, source risk, delivery risk, planning risk, and production risk.

3. The method of claim 2, wherein the identified risk values for the environmental risk, source risk, delivery risk, and planning risk categories include risk based on geolocation of the represented physical site.

4. The method of claim 2, wherein the identified risk value for the delivery risk category is based on methods for the transportation of materials between the represented physical sites.

5. The method of claim 2, wherein the identified risk value for the production risk category is based on production processes at the represented physical site.

6. The method of claim 1, wherein the designated visual indication displays a color including at least one of: red, green, and yellow, the color displayed based on the comparison between the determined total risk value and the set of tolerance ranges risk tolerance threshold.

7. The method of claim 1, wherein the one or more logical stations represent at least one of: a supplier site, a production site, an inventory site, a distribution site, a storage site, a retailer site, and a customer site.

8. The method of claim 1, wherein the identified risk values and the determined total risk value are probabilistically calculated by the processor using a fault tree analysis.

9. The method of claim 1 further comprising:
    based on the identified risk values for a given logical station, determining probabilistic risk contributed by each downstream supply chain path for the given logical station; and
    visually indicating the determined probabilistic risk at the respective supply chain path in the displayed visual model.

10. The method of claim 9 further comprising:
determining a critical supply chain path that contributes a highest probabilistic risk to the given logical station; and
visually indicating the respective highest probabilistic risk at the respective supply chain path in the visual model.

11. A computer system for controlling operations of physical sites based on modeling of a supply chain network including the physical sites, the computer system comprising:
a user interface configured to display a visual model of a supply chain network, the visual model including: (i) one or more logical stations graphically representing physical sites in the supply chain network, the physical sites including a manufacturing site, and (ii) one or more logical transits graphically representing transportation of materials between the represented physical sites;
at least one processor communicatively coupled to the user interface and to associated computer memory, the at least one processor configured to:
create, maintain in the computer memory, and continuously monitor and update the visual model of the supply chain network for display on the user interface;
for each given logical station of the one or more logical stations that graphically represent physical sites, the at least one processor configured to:
in an automated manner identify risk values in real time for each risk category in a set of risk categories associated with the given logical station, the risk categories including at least a risk associated with materials and a risk associated with resource usage and flow between physical areas internal to a modeled manufacturing site, the identifying determining the risk values based on physical conditions related to: (a) the physical site represented by the given logical station, (b) each physical site, of a plurality of physical sites, represented by a respective logical station positioned in a downstream supply chain path to the given logical station, and (c) each transportation represented by a respective logical transit positioned in the downstream supply chain path,
generate a graphical representation visually comparing the identified risk values for each risk category in the set of risk categories of the given logical station, the graphical representation being displayed at the given logical station in the visual model,
automatically determine a total risk value for the given logical station based on the identified risk values for each risk category in the set of risk categories, wherein the determining designates a visual indication of the determined total risk value based on comparing the determined total risk value to a set of tolerance ranges that specify probabilistic distance of the determined total risk value from a risk tolerance threshold, the designated visual indication being presented at the given logical station in the visual model;
display on the user interface, the visual model having the generated graphical representations at respective logical stations and having the designated visual indications at respective logical stations, said displayed visual model providing risk assessment in the modeled supply chain network;
automatically update the visual model to minimize associated risk in the modeled supply chain network; and
output a signal to automatically control operations of the physical sites by automatically programming control systems for the physical sites, automatically programming the transportation modeled in the supply chain network, or automatically programming other modeling systems that control operation of the physical sites or the transportation of materials between the physical sites.

12. The computer system of claim 11, wherein the set of risk categories further includes at least one of: environmental risk, source risk, delivery risk, planning risk, and production risk.

13. The computer system of claim 12, wherein the identified risk values for the environmental risk, source risk, delivery risk, and planning risk categories include risk based on geolocation of the represented physical site.

14. The computer system of claim 12, wherein the identified risk value for the delivery risk category is based on methods for the transportation of materials between the represented physical sites.

15. The computer system of claim 12, wherein the identified risk value for the production risk category is based on production processes at the represented physical site.

16. The computer system of claim 11, wherein the designated visual indication displays a color including at least one of: red, green, and yellow, the color displayed based on the comparison between the determined total risk value and the set of tolerance ranges.

17. The computer system of claim 11, wherein the one or more logical stations represent at least one of: a supplier site, a production site, an inventory site, a distribution site, a retailer site, and a customer site.

18. The computer system of claim 11, wherein the identified risk values and the determined total risk value are probabilistically calculated by the processor using a fault tree analysis.

19. The computer system of claim 11, wherein the at least one processor is further configured to:
based on the identified risk values for a given logical station, determine probabilistic risk contributed by each downstream supply chain path for the given logical station;
visually indicate the determined probabilistic risk at the respective supply chain path in the visual model on the user interface;
determine a critical supply chain path that contributes a highest probabilistic risk to the given logical station; and
visually indicate the respective highest probabilistic risk at the respective supply chain path in the displayed visual model on the user interface.

20. A computer program product comprising a non-transitory computer-readable medium storing instructions for controlling operations of physical sites based on modeling of a supply chain network including the physical sites, the instructions, when loaded and executed by a processor, cause the processor to:
create, store in computer memory, and continuously monitor and update a visual model of a supply chain network, the created visual model including: (i) one or more logical stations graphically representing physical sites in the supply chain network, the physical sites including a manufacturing site, and (ii) one or more logical transits graphically representing transportation of materials between the represented physical sites;

for each given logical station of the one or more logical stations that graphically represent physical sites, using a processor configured to:

automatically identify risk values in real time for each risk category in a set of risk categories associated with the given logical station, the risk categories including at least a risk associated with materials and a risk associated with resource usage and flow between physical areas internal to a modeled manufacturing site, wherein the identifying is based on physical conditions related to: (a) the physical site represented by the given logical station, (b) each physical site, of a plurality of physical sites, represented by a respective logical station positioned in a downstream supply chain path to the given logical station, and (c) each transportation represented by a respective logical transit positioned in the downstream supply chain path, generate a graphical representation visually comparing the identified risk values for each risk category in the set of risk categories of the given logical station, the graphical representation being displayed at the given logical station in the visual model, automatically determine a total risk value for the given logical station based on the identified risk values for each risk category in the set of risk categories, wherein the determining designates a visual indication of the determined total risk value based on comparing the determined total risk value to a set of tolerance ranges that specify probabilistic distance of the determined total risk values from a risk tolerance threshold, the designated visual indication being presented at the given logical station in the visual model;

display the visual model having the generated graphical representations at respective logical stations and having the designated visual indications at respective logical stations, said displayed visual model providing risk assessment in the modeled supply chain network;

automatically update the visual model to minimize associate risk in the modeled supply chain network; and output a signal to automatically control operations of the physical sites by automatically programming control systems for the physical sites, automatically programming the transportation modeled in the supply chain network, or automatically programming other modeling systems that control operation of the physical sites or the transportation of materials between the physical sites.

* * * * *